Oct. 8, 1968 J. S. MATHIAS ET AL 3,404,661

EVAPORATION SYSTEM

Filed Aug. 26, 1965 3 Sheets-Sheet 1

INVENTORS
JOSEPH S. MATHIAS
ALFRED A. ADOMINES
RICHARD H. STORCK
JOHN MC NAMARA

BY Fred Fisher

ATTORNEY

Oct. 8, 1968 J. S. MATHIAS ET AL 3,404,661

EVAPORATION SYSTEM

Filed Aug. 26, 1965

3 Sheets-Sheet 2

United States Patent Office 3,404,661

Patented Oct. 8, 1968

3,404,661
EVAPORATION SYSTEM

Joseph S. Mathias, Riverton, N.J., and Alfred A. Adomines, Wayne, Richard H. Storck, Telford, and John McNamara, Roslyn, Pa., assignors to Sperry Rand Corporation, New York, N.Y., a corporation of Delaware Filed Aug. 26, 1965, Ser. No. 482,785

2 Claims. (Cl. 118—49)

ABSTRACT OF THE DISCLOSURE

This invention relates to an off-line system, for the deposition of materials on a substrate by means of evaporation, sputtering, etc. Substrates which are introduced into an input chamber are directed along a line to an output chamber. The various evaporation chambers are oriented orthogonally off the line. One or more of the chambers can be out of operation without disturbing the operation of the remaining evaporation units, which can assume the functions of the inoperative chamber.

This invention relates to a system useful for the automatic deposition of masked configurations onto suitable substrates, and, in particular, to an off-line automatic vacuum system for preparing electronic circuits.

Automatic vacuum systems, in the past, for the preparation of masked circuitry on suitable substrates are, generally, of the "on-line" sequential station type system, wherein a substrate is moved directly from a first station to a second station where, upon evaporation of a suitable masked configuration, the substrate is directly moved to a subsequent station where subsequent operations take place. Such an "on-line" system suffers from an entire breakdown when one or more stages is faulty.

In another type of automatic vacuum system, a single evaporation stage utilizes a plurality of changeable masks. Here, as before, when the stage is faulty or under repair, overall breakdown and down-time occurs.

It is, thus, a purpose of this invention to provide an "off-line" system for the continuous production of evaporated or sputtered configurations onto a series of prepared substrates.

The advantages of this invention, over what was done before, include:

(1) A system, constructed in accordance with the teachings of this invention, can be of modular construction, thereby permitting independent operation of each stage.

(2) The "off-line" construction of such system permits removal of an inoperative evaporator unit without disturbing the operation of remaining evaporation units, thus making it feasible to use a stand-by spare chamber for emergency use.

(3) The evaporation units can have removable top and bottoms to permit easy access for care and maintenance, without overall downtime.

(4) Mask holders, and other internal working equipment, can be attached to the removable top and bottom of an evaporating unit, thereby permitting easy access to the internal equipment for care and adjustments.

(5) The evaporation chambers can be operated for periods of long duration without exposing the evaporation chamber to atmospheric contamination, whereby the evaporation chamber is extremely clean.

(6) The utilization of separate evaporation chambers for each material to be evaporated, or sputtered, permits the operator to adjust each chamber for optimum working conditions, whereby contamination of the evaporated material, by the material previously evaporated, is eliminated.

(7) The input and output stages can be loaded and unloaded with substrates without interrupting the evaporations.

(8) The transport system, constructed in accordance with this invention, permits transportation of the substrates through a vacuum valve without interfering with valve operation.

(9) The transport system, as taught by this invention incorporates means for making a turn in a limited space.

(10) The transport system, as taught by this invention incorporates a means for interchanging substrates within a test chamber.

(11) The utilization of a lock valve system, as described herein, permits the intermixing of evaporated and sputtered layers.

In accordance with one embodiment of this invention a plurality of evaporation chambers (in which deposition of material, by evaporation, sputtering, etc. may take place) are oriented in an "off-line" relationship. Substrates, introduced into an input chamber, are directed along a line to an output chamber. Various evaporation chambers are oriented off the line, at right angles or orthogonally disposed. Thus, one or more chambers can be in operation, or not in use, without interfering with the remaining chambers.

Other objects and advantages of this invention, together with its construction and mode of operation, will become more apparent from the following description, when read in conjunction with the accompanying drawings, in which like reference symbols refer to like components and parts and in which.

Figure 1:
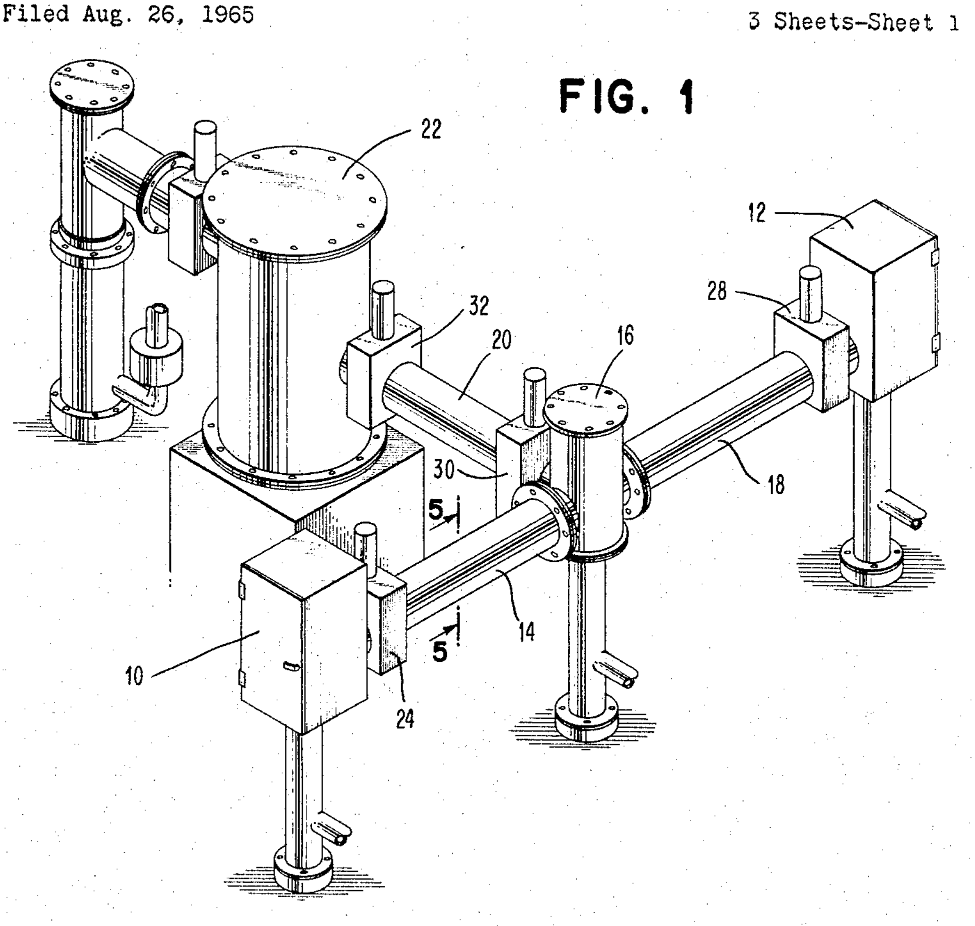
FIG. 1 is a perspective view of a vacuum system in accordance with one embodiment of this invention.

Referring to FIG. 1, there is illustrated a single stage evaporation system including an input box or chamber 10 and an output box or chamber 12. A transfer chamber 14 couples the input box 10 to a turn chamber 16. The turn chamber 16 is coupled to the output box 12 by means of a second transfer chamber 18, thus forming a "line" between the input chamber 10 and output chamber 12 including the first transfer chamber 14. The turn chamber 16, and the second transfer chamber 18. At right angles with the transfer chamber 14 and 18, and "off-line" therewith, is a transfer chamber 20 in which test operation can take place. An evaporation chamber 22 is coupled at the opposite end of the test chamber 20.

A lock valve 24 couples the input box 10 to the transfer chamber 14. The transfer chamber 14 is coupled to the turn chamber 16. Similarly, a valve 28 couples the transfer chamber 18 to the output box 12. Another lock valve 30 couples the turn chamber 16 to the test chamber 20, while still another lock valve 32 is coupled between the test chamber 20 and the evaporation chamber 22.

Figure 2:
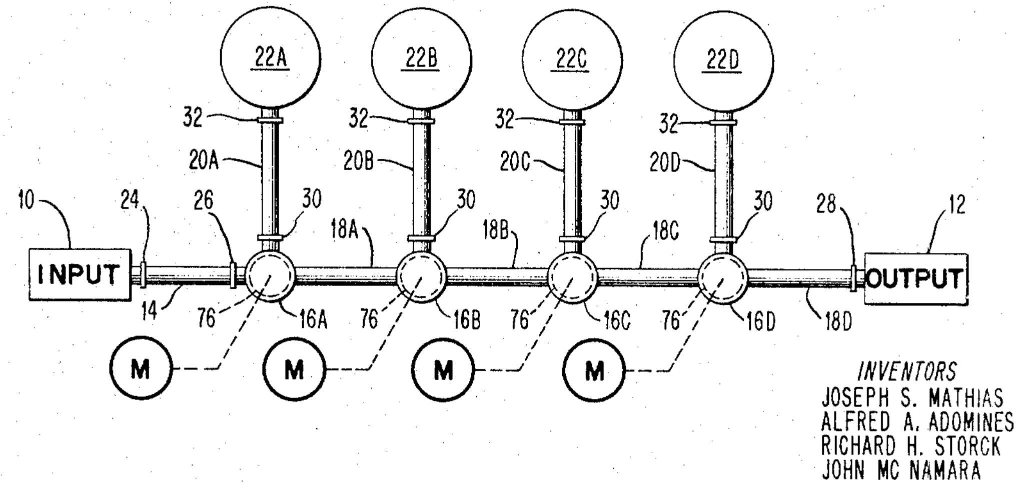
FIG. 2 is a diagrammatical view illustrating a plurality of stations in accordance with one embodiment of this invention.

FIG. 2 illustrates, schematically, a multichamber automatic evaporation system, including an input box 10 and an output box 12 connected by a "line" including a serially connected transfer chamber 14, turn chamber 16A, transfer chamber 18A, turn chamber 16B, transfer chamber 18B, turn chamber 16C, transfer chamber 18C turn chamber 16D, and transfer chamber 18D. Respectively tapped or coupled, off-line, to each of the turn chambers 16A, 16B, 16C, 16D are test chambers 20A, 20B, 20C, 20D, which are coupled, respectively, to evaporation chambers 22A, 22B, 22C, 22D. Suitable lock valves 30, 32 are coupled to the test chambers 20A, 20B, 20C, 20D. Lock valves 24 and 26 are coupled to the end of transfer chamber 14 to isolate the input chamber 10 from the rest of the system.

Figure 3:
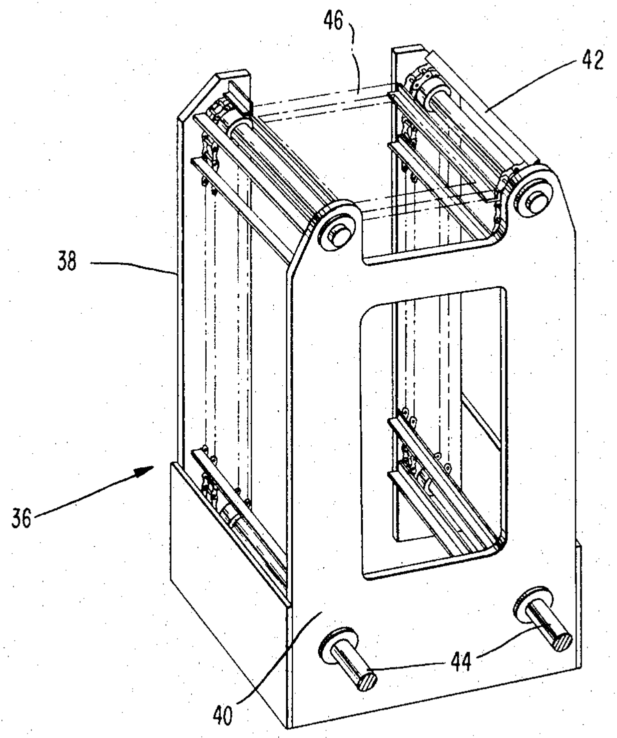
FIG. 3 is a perspective view of a substrate holder storage elevator for carrying a plurality of substrate holders.

FIG. 3 is a perspective view of a substrate holder storage elevator 36 including a pair of oppositely disposed walls 38 and 40. A plurality of horizontal shelves 42 are oriented, on opposite sides, between the walls 38 and 40, whereby a plurality of substrate holders 46 can be supported by the various shelves 42. The shelves 42 are raised, an increment at a time, by a suitable stepping motor and gearing network 44.

Figure 4:
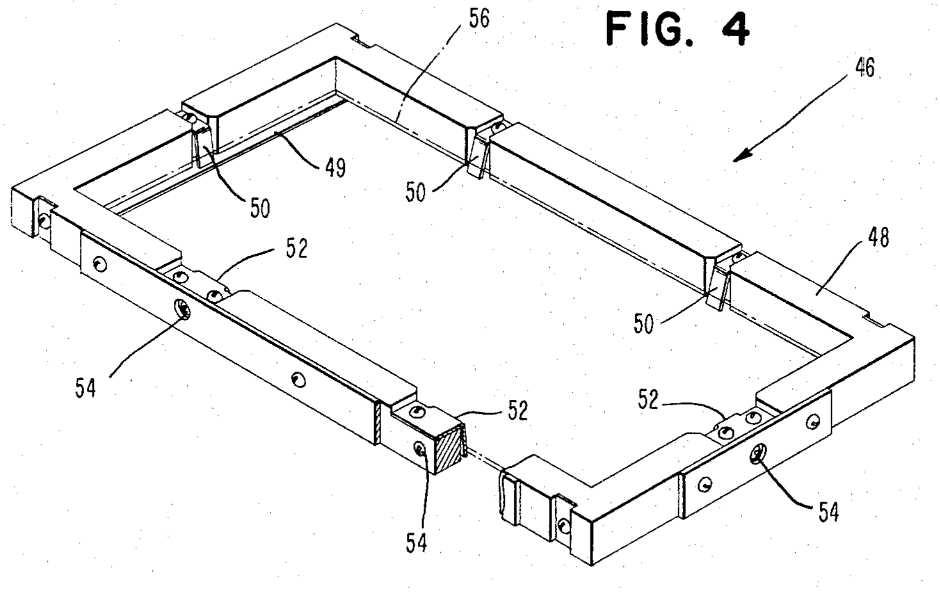
FIG. 4 is a perspective view of a substrate holder.

FIG. 4 is a perspective view of a substrate holder 46. The substrate holder 46 includes a rectangular frame 48 having an inner ledge 49, with fixed positioning springs 50 along two adjacent sides of the frame 48, above the ledge 49. Adjustable positioning springs 52 are located along the opposite two adjacent sides of the frame 48. The adjustable springs 52 are adjustable by suitable adjustment screws 54 located within the sides of the frame 48. A substrate 56 (illustrated in dotted outline) can be oriented, rested on the ledge 49, within the frame 48 and within the positioning springs 50 and 52. The substrate, preferably, is a sheet of planar glass; however, other materials can be used.

An automatic vacuum system, in general, comprises six different units: an input chamber 10, an output chamber 12, a transfer chamber 14, 18, a turn chamber 16, a test chamber 20, and a main evaporation (or sputtering) chamber 22, as illustrated for example in FIG. 1. One each of the input and output chambers 10, 12 is used. As many turn chambers 16 and test chambers 20 are used as there are main evaporation or sputtering units 22. For example, as illustrated in FIG. 2, there are four turn chambers 16A, 16B, 16C, 16D, four test chambers 20A, 20B, 20C, 20D, and four evaporation chambers 22A, 22B, 22C, 22D. The number of evaporation units 22 is determined by the number of layers to be evaporated: For example, one evaporation chamber for each layer. In one embodiment, utilizing ten layers of evaporated and sputtered material, ten evaporation chambers 22 are used. The number of transfer tubes is determined by the interconnections desired.

The input chamber 10 and the output chamber 12 are identical, except for elevator 36 directions, in one preferred embodiment. Each chamber 10, 12 is essentially a storage chamber for feeding batches of substrates 56 into or out of the system, without disturbing the vacuum in an evaporation chamber 22. A door, (not shown), within the input chamber 10, is provided for loading a batch of substrates 56, within individual holders 46, onto the storage elevator mechanism 36. The lock valves 24, 28 isolate the input and output chambers 10, 12, respectively from the rest of the system.

The transfer chamber 14 is an elongated chamber attached at one end to the lock valve 24 and, at the other end, to the lock valve 26 to the turn chamber 16. The transfer chamber 14 interconnects the various chambers and is of sufficient size to provide access for care and maintenance. Suitable access ports (not shown for simplicity of description) are coupled to the transfer chambers 14. The turn chamber 16 is a fixed chamber to provide for making a right angle turn.

The test chamber 20 is a modified transfer chamber with provisions for testing the substrate either before or after each evaporation. The test chamber 20 also acts as an isolation chamber for a sputtering operation. The evaporation unit 22 comprises a chamber containing an evaporation source, a supply of evaporants, a sputter and shielding system, a mask changer, a substrate alignment system, and the evaporation monitoring equipment.

Figure 5:
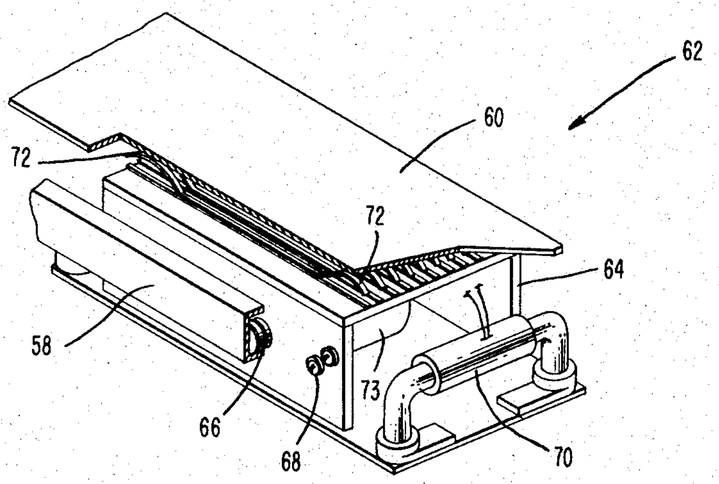
FIG. 5 is a sectional view taken along the lines 5—5 of FIG. 1 showing a section of a transfer chamber illustrating a substrate holder carrier including a trolley and associated rails.
Figure 6:
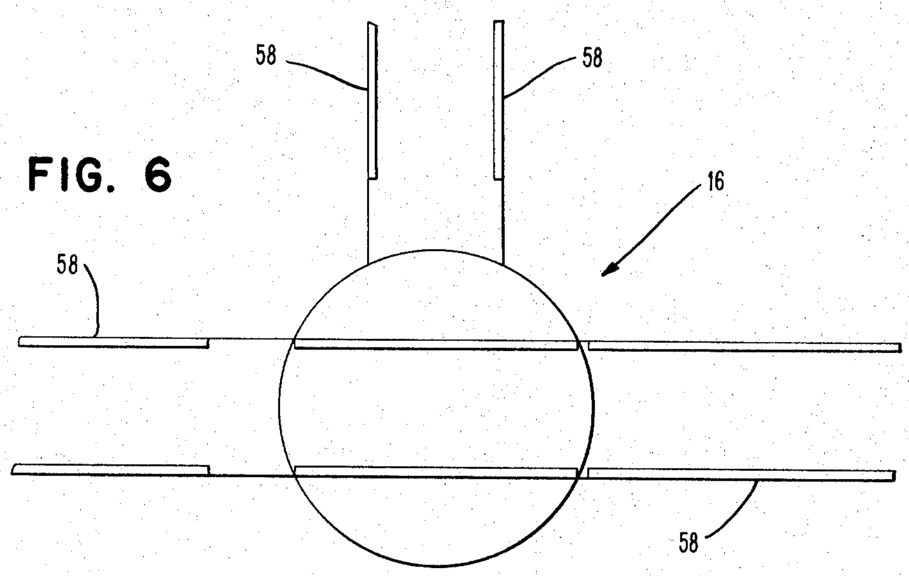
FIG. 6 is a diagrammatical view illustrating a turntable in accordance with one embodiment of this invention.

FIG. 5, a perspective view, partly in sectional form of sections 5—5 of FIG. 1, illustrates the internal workings of the transfer chamber 18, including guide rails 58 located at either side of the transfer chamber 18. Internally, at the top of the transfer chamber 18, is a transport rail 60 which, as illustrated, can include ten channels. A trolley carrier 62, which is adapted to carry a substrate holder 46 therebeneath, includes a generally rectangular frame 64 including a plurality of drive wheels 66 at opposite sides thereof together with associated guide wheels 68. The drive wheels 66 are adapted to ride within the guide rails 58 of the transfer chamber 18. Electromagnets 70 are oriented along the forward and rear portions of the base of the carrier 62. A ten channel bow trolley or ten channel set of contact brushes 72 is coupled to the top of the carrier 62. The contact brushes 72 are oriented at both the front and the rear of the trolley carrier 62. The brushes 72 are adapted to engage with the transport rail 60. A motor 73 and drive gear 75, located internally within the frame 64, couples power from the transport rail 60 to the drive wheels 68.

In operation, a batch of substrates 56 are installed into respective substrate holders 46 (FIG. 4). The substrate holders 46, containing the individual substrates 56, are loaded into the storage elevator mechanism 36 (FIG. 3) which is located within the input chamber 10 (FIG. 2). The door of the chamber 10 is closed and the chamber 10 is pumped down to approximately $1\times10^{-5}$ millimeters of mercury. The chamber 10 is back filled with gas and a glow discharge is applied to clean the substrates 56. Upon termination of the glow discharge, the transfer chamber 14 is filled with gas; the lock valve 24 is opened. A carrier trolley 62 (FIG. 5) enters the input chamber 10 and picks up the top substrate holder 46 containing the top substrate 56. The carrier 62 then transports the substrate holder 46 into the transport chamber 14. As soon as the substrate holder 46 is in the transport chamber 14, clear of the lock valve 24, the lock valve 24 closes and the glow discharge is resumed in the input chamber 10. The volume enclosed between the lock valve 24 and the lock valve 26 is evacuated. The lock valve 26 is opened to the turn chamber 16.

At the turn chamber 16, a turn table 76 therein (activated by a suitable motor 78) rotates the carrier 62 through a right angle turn towards the test chamber 20. The lock valve 26 is closed and the lock valve 30 is opened. As the carrier 62 enters the test chamber 20 and approaches the lock valve 32, the lock valve 30 is closed. At this stage, the turn chamber 16 and the test chamber 20 are at approximately $1\times10^{-5}$ mm. of Hg or less. The lock valve 32 is opened, and the carrier 62 enters the evaporation chamber 22, depositing the substrate holder 46 (containing the substrate 56) at a parked position. The carrier 62 then withdraws to the test chamber 20 and the lock valve 32 is closed. The evaporation chamber 22 is then pumped down from the equilibrium pressure for the test chamber 20, to the desired evaporation pressure depending on the material to be evaporated. The equilibrium pressure between the evaporation chamber 22 and the test chamber 20 is closer to the evaporation chamber pressure as its volume is much larger than the test chamber volume. The appropriate mask is selected from the mask storage (not shown) and oriented into position above the evaporation source. The substrate is placed on top of the mask and evaporation of material takes place. The mask is subsequently withdrawn and the substrate 56 reverts to its parked position.

During the time a first substrate 56*a* is being processed in the evaporation chamber 22A, the carrier 62*a* returns to the input chamber 10 and picks up the second substrate holder 46*b* (containing a substrate 56*b*) which had been raised to the top of the elevator 36 and starts it on its cycle. As soon as the evaporation in the first evaporation chamber 22A is completed a second carrier **62*b* enters the evaporation chamber 22A and withdraws into the test chamber 20A with the completed (one evaporation) substrate 56*a*. The lock valve 32*a* again closes. As soon as the second carrier 62*b* clears the turn chamber 16A on its way into the transfer chamber 18A, the lock valve 26 opens, and the first carrier 62*a* enters into the turn chamber 16A with the second substrate 56*b*. The second substrate 56*b* is carried into the evaporation chamber 22A, the same as the first substrate 56*a* had been before. The second carrier 62*b* performs a similar procedure for the first substrate 56*a* entering the evaporation chamber 22B** for the second layer of the required evaporations.

The cycle is repeated for *n* layers (for example, ten layers) and, as illustrated in FIG. 2, four layers, each layer being applied at an individual evaporation chamber 22. When desired, more than one layer, or a portion of a layer, can be deposited at a single evaporation chamber 22.

After the initial start, a substrate 56 is available at each evaporation chamber 22, and proper selection of evaporation (or sputtering sources) permits the simultaneous evaporation of the various sources. The mechanical operations involved in mask positioning, substrate handling and transportation for the various substrates 56 can take place coincidentally. The completed substrates 56, containing *n* layers are removed from the last evaporation chamber $22_n$, and stored in the output elevator $36_n$ in the output chamber 12. As soon as the supply of substrates 56 at the input chamber 10 is exhausted, a new batch is installed and the cycle is continued. The elevator 36 in the output chamber 12 is also emptied by batches without disturbing the evaporation cycle.

In another embodiment of this invention, a single evaporation chamber system can be used for automatically performing all the evaporation layers onto suitable substrates. In such a system, the various sources of evaporation material are stored in the evaporation chamber 22. The substrates 56 and substrate holders 46 are installed in the elevator 36 within the input chamber 10. After pumping down, the first lock valve 24 is opened and the transport trolley 62 enters the input chamber 10 and electromagnetically picks up the top substrate 56 and holder 46. The carrier 62 then travels to the turn chamber 16 and executes a turn, passing through the lock valve 30 into the test chamber 20. The substrate 56 is left in a glow discharge position and the trolley withdraws to the turn chamber 16. The lock valve 30 is closed and the test chamber 20 is back filled with gas. A glow discharge takes place and, after a suitable time, the glow discharge is turned off and the chamber 20 is evacuated to approximately $1 \times 10^{-5}$ mm. of Hg, and the lock valve 30 to the turn chamber is opened. The transport trolley carrier 62 then picks up the substrate 56 and moves through the lock valve 32 to enter the evaporation chamber 22. The substrate 56 and holder 46 are deposited into parked position and transport trolley 62 removed.

An electromagnetic pick-up (not shown) raises the substrate 56 and substrate holder 46 while a preselected mask and mask holder, not shown, are moved into position. With the selected mask in position, the substrate 56 is put into contact with the mask. The substrate holder 46 is held in position during the first evaporation. After the first evaporation, following standard practices of the art, the mask and mask holder are withdrawn to the mask storage. A second mask and associated mask holder are brought into position. The second layer of the multilayer circuit is then evaporated onto the substrate 56. The cycle is repeated as many times as there are layers on the circuit.

As the various evaporations are being performed on the first substrate **56*a*, the transport trolley 62 returns to the input box 10 and picks up the second substrate 56*b*, and associated substrate holder 46*b*. The substrate 56*b* is treated exactly as the first substrate 56*a*, except that, at the end of the glow discharge, the "glow discharge" parked position for the substrate 56*b* is lowered. The glow discharge atmosphere is evacuated and transport trolley 62 returns from the turn chamber 16. The transport trolley 62 passes over the newly cleaned second substrate 56*b* and moves into the evaporation chamber 22. There, the trolley 62 picks up the completed first substrate 56*a* and moves it to a second "completed" parked position, depositing same, to the rear of the glow discharge position (i.e. to the rear of the position of the second substrate 56*b*) within the test chamber 20. The trolley 62 then moves forward to the glow discharge position where the substrate 56*b* and second substrate holder 46*b* have just been raised, by suitable means, into pick up position. The substrate 56*b* and second substrate holder 46*b* are picked up moved through the lock valve 32, into the evaporation chamber 22, and left in the evaporation parked position. The transport trolley 62 returns to the test chamber 20. The lock valve 32 closes and the substrate 56*b* proceeds through the evaporation cycle. As soon as the lock valve 32 closes, after leaving the second substrate 56*b* in the evaporation chamber 22, the transport trolley 62 moves to the "completed" parked position and picks up the first substrate 56*a* and substrate holder 46*a*. The lock valves 30 and 28 are opened and the "completed" substrate moved to the output chamber 12 where it is deposited on the output elevator 36. The trolley then travels to the input chamber 10 where it picks up the third substrate 56*c* and substrate holder 46*c*. The procedure follows for the third substrate 56*c*** the same as before.

When the supply of substrate holders 46 and substrates 56 in the input chamber 10 is exhaused, a new batch is installed. The pump down time for the input chamber 10 is short enough so that no time is lost in the evaporation cycle. The removal of completed substrates 56 is equally simplified.

The evaporation chamber 22 includes a removable top and bottom with all of the internal components attached, so that the entire internal mechanism is easily removable from the system by either lowering the bottom or raising the top. All cleaning, reloading (of masks or evaporants), and adjustment operations are carried out with the mechanism outside of the vacuum chamber.

When the evaporation chamber 22A (FIG. 2) is opened for servicing, the lock valve 32 is closed, permitting evaporation to take place in other evaporation chambers 22B, 22C, 22D. Thus, as illustrated in FIG. 2, one of the four chambers 22A, 22B, 22C, 22D can be serviced, while the remaining chambers are in continuous operation.

In one operative embodiment, an evaporation chamber provides sufficient material for over eight hours of circuit evaporation without opening the system to atmospheric contamination.

The test chamber 20 contains a glow discharge cleaning system. The substrate 56, to be cleaned, together with its substrate holder 46 is left on a "glow discharge" parked position. The substrate 56 is cleaned with a conventional glow discharge. A mechanism (not shown) consisting of a raising and lowering mechanism and a holding rack make it possible to lower the substrate 56 sufficiently that a second substrate can pass over the "glow discharge" position. A stationary parked position to the rear of the glow discharge position makes it possible to transport and clean a second substrate 56 while evaporation is taking place in the evaporator 22. The completed substrate **56*a* can then be interchanged for a freshly cleaned substrate 56*b* without making the trip to the output chamber 12, to the input chamber 10, and back to the test chamber 20**. This provision permits several operations to be performed simultaneously, thereby reducing cycle time for a complete substrate.

The transport system utilizes a pair of oppositely disposed channel rails 58, an overhead multichannel transport rail 60 (for power and control), and a transport trolley carrier 62. The channel rail 58 is a shallow U-shaped bar mounted on brackets suspended from the top of the transport tubes. The rails 58, 60 approach to within a fraction of an inch of the lock valve closure plates. The clearance is such that a valve can be operated without disturbing the rails 58, 60. The trolley carrier 62 has two drive wheels 66 on each side that ride on the lower flange of the channel guide rail 58. Of the seven idler wheels 68 on each side of the carrier 62, three wheels 68 ride against the top flange, two against the bottom flange, and two against the web of the rail 58. The idler wheels 68 keep the trolley carrier 62 from dipping, wobbling, or losing traction when it crosses the gap at each lock valve. Motive power is supplied by a reversible electric motor 73; all four drive wheels 66 are gear driven by suitable drive gear 75. Miniature switch bumpers (not shown) at either end of the carrier 62 stop the trolley 62 at precise positions. A projection from the side is used to trip a miniature switch for stops that are not too precise. The two electromagnets 70, used to pick up and carry the substrate 56 and substrate holder 46, have a small gap separating the face of the magnet 78 from the substrate holder 46 during pick up, thereby permitting the substrate 56 to drop quickly. The substrate holder 46 consists essentially of a magnetic steel frame so that it can be picked up by the electromagnets 70.

The substrate holder 46 comprises a metal frame 48 with two hardened steel bumper pads on two sides to minimize positioning errors due to wear. Six springs 50, 52 are mounted on the inside of the frame 48. Three of the springs 50 are used for positioning; three additional springs 52 on the opposite sides, position bumpers are forced away from the inside of the holder frame 48 by adjustment screws 54. These screws 54 are used to precisely adjust a substrate 56 in reference to the hardened steel bumper pads. Two thin straps under the holder act as a ledge 49 to keep the substrate 56 from dropping out of the holder during transport and positioning.

A mask holder, for use in the evaporator chamber 22, is similar to the substrate holder 46. The mask holder and the substrate holder 46 are both used to locate a series of circuits at precise locations on a given substrate. The need for precise machining of both components is eliminated because both the mask holder and substrate holder 46 are adjustable.

Thus, there has been described a complete vacuum system wherein a plurality of substrates automatically can have circuitry deposited thereupon in an off-line manner. Other modifications and embodiments will suggest themselves to those ordinarily skilled in the art; thus, it is desired that this invention be limited solely by the scope of the allowed claims.

The embodiments of the invention in which an exclusive property or privilege is claimed are defined as follows:

1. A system for vapor desposition comprising:

(a) an input chamber adapted to be evacuated;

(b) an output chamber adapted to be evacuated;

(c) a plurality of evacuable turn chambers disposed spacedly in-line with, and intermediate of, said input and output chambers;

(d) a plurality of evacuable transfer chambers comprising a separate transfer chamber in-line with and connecting each one of a next in-line pair of turn chambers, and additionally connecting the input and output chambers separately with the end-of-the-line chambers;

(e) a plurality of evacuable, vapor coating evaporation chambers which are equal in number to, and arranged off-line with respect to, said turn chamber;

(f) a separate, evacuable transfer chamber connecting each turn chamber with an evaporation chamber paired therewith;

(g) all transfer chambers including a lock valve at each end thereof whereby to control communication between the transfer chamber and the chamber connected thereat;

(h) a rail system disposed within each transfer and turn chamber and in operative association with each other;

(i) a substrate support and transport means adapted to ride said rails serially through said transfer and turn chambers and through appropriate ones of said lock valves and to accept and deliver said substrate with respect to the input and output chambers;

(j) at least one of said off-line transfer chambers comprising a test chamber;

(k) each of said off-line transfer chambers comprising a coating chamber with respect to the evaporation chamber connected therewith; and (l) each turn chamber including means to rotate its rail system whereby to selectively operatively associate with either the in-line rail systems or the off-line rail system of the transfer chamber connected thereto.

2. A system as in claim 1 wherein said rail systems comprise a multichannel overhead transport rail and said substrate support and transport means comprises:

(a) a carrier including a framework having oppositely disposed drive wheels adapted to engage with said guide rails;

(b) electrical means to drive said wheels;

(c) a first electromagnet coupled to the front of the carrier;

(d) a second electromagnet coupled to the rear of said carrier;

(e) overhead contact brushes located in the front and rear of said carrier;

(f) said contact brushes being coupled to said electromagnets and electrical drive means; and (g) said contact brushes being adapted to engage with said transport rail.

References Cited

UNITED STATES PATENTS

| | | | |
|---|---|---|---|
| 2,239,642 | 4/1941 | Burhardt et al. | 204—192 |
| 2,360,505 | 10/1944 | Medenwald et al. | |
| 2,930,347 | 3/1960 | Bullott | 118—50 X |
| 2,986,115 | 5/1961 | Toulmin | 118—48 |
| 3,148,631 | 9/1964 | Gorjanc | 104—88 |
| 3,228,794 | 1/1966 | Ames | 118—49 X |
| 3,238,918 | 3/1966 | Radke et al. | 118—49.1 |
| 3,250,694 | 5/1966 | Maissell et al. | 118—49 |
| 3,300,065 | 1/1967 | Witmer | 214—6 |
| 3,314,395 | 4/1967 | Hemmer | 118—49 |

CHARLES A. WILLMUTH, *Primary Examiner.*

MORRIS KAPLAN, *Assistant Examiner.*